(12) United States Patent
Venolia (10) Patent No.: US 7,477,268 B2
(45) Date of Patent: *Jan. 13, 2009

(54) ZOOMING CONTROLLER

(75) Inventor: Daniel Scott Venolia, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/648,480

(22) Filed: Dec. 28, 2006

(65) Prior Publication Data

US 2007/0182763 A1 Aug. 9, 2007

Related U.S. Application Data

(60) Continuation of application No. 10/776,389, filed on Feb. 10, 2004, now Pat. No. 7,372,473, which is a division of application No. 10/082,527, filed on Feb. 22, 2002, now Pat. No. 6,778,195, which is a continuation of application No. 09/551,411, filed on Apr. 18, 2000, now Pat. No. 6,366,303, which is a continuation of application No. 08/104,251, filed on Aug. 9, 1993, now Pat. No. 6,061,062, which is a continuation of application No. 07/811,830, filed on Dec. 20, 1991, now abandoned.

(51) Int. Cl.
*G09G 5/00* (2006.01)
*G06F 3/048* (2006.01)

(52) U.S. Cl. .................. 345/661; 345/676; 715/856

(58) Field of Classification Search .............. 345/661, 345/667, 676, 684, 184; 715/719–723, 730, 715/731, 856
See application file for complete search history.

(56) References Cited

U.S. PATENT DOCUMENTS

| | | | | |
|---|---|---|---|---|
| 4,755,811 A | * | 7/1988 | Slavin et al. ................. | 345/668 |
| 4,790,028 A | * | 12/1988 | Ramage ..................... | 382/298 |
| 4,794,388 A | * | 12/1988 | Matthews ................... | 345/661 |
| 4,896,291 A | * | 1/1990 | Gest et al. ................... | 715/841 |
| 5,032,989 A | * | 7/1991 | Tornetta ....................... | 705/1 |
| 5,075,673 A | * | 12/1991 | Yanker ....................... | 345/163 |
| 5,129,057 A | * | 7/1992 | Strope et al. ................ | 715/833 |
| 5,136,690 A | * | 8/1992 | Becker et al. ............... | 715/853 |
| 5,365,254 A | * | 11/1994 | Kawamoto ................. | 345/157 |
| 5,375,199 A | * | 12/1994 | Harrow et al. .............. | 715/771 |
| 5,388,197 A | * | 2/1995 | Rayner ....................... | 715/723 |
| 5,491,781 A | * | 2/1996 | Gasperina ................... | 715/786 |
| 6,061,062 A | * | 5/2000 | Venolia ...................... | 715/856 |
| 6,366,303 B1 | * | 4/2002 | Venolia ...................... | 715/856 |
| 6,486,896 B1 | * | 11/2002 | Ubillos ....................... | 715/784 |
| 6,778,195 B2 | * | 8/2004 | Venolia ...................... | 715/856 |

* cited by examiner

*Primary Examiner*—Jeffery A. Brier
(74) *Attorney, Agent, or Firm*—Blakely, Sokoloff, Taylor & Zafman LLP (57) ABSTRACT

A method and device for accessing a broad data field having a fine resolution. The user selects a scale which can be varied. The scale controls a range within the data field. By moving the range to encompass different portions of the data field, the user can scan that portion of the data field. The present invention allows the user to simultaneously select the scale while moving the range over different portions of the data field. Thus, the user can "zoom in" and "zoom out" of different portions of the data field.

47 Claims, 10 Drawing Sheets

FIG. 1

Aacker, Frank
Beisel, Edward
Burg, James
~~Collins, Richard~~
Dow, Christine
Finck, Dan
Gong, Dianne
Henneberry, Mark
Jeong, James
Drafft, Jon
Lubek, Ray
McNelly, Dan
Neil, Jane
Perreira, Candy
Riordan, Herlinda
Seiler, Mike
Starr, Debra Ann
Tremblay, Troy
Whitcomb, Allan
Zvonek, Paul

ZOOMING CONTROLLER

This application is a continuation of U.S. patent application Ser. No. 10/776,389, filed on Feb. 10, 2004, now U.S. Pat. No. 7,372,473 which is a divisional application of U.S. patent application Ser. No. 10/082,527, filed on Feb. 22, 2002, now issued as U.S. Pat. No. 6,778,195, which is a continuation application of U.S. patent application Ser. No. 09/551,411, filed Apr. 18, 2000, now issued as U.S. Pat. No. 6,366,303, which is a continuation application of U.S. patent application Ser. No. 08/104,251, filed Aug. 9, 1993, now issued as U.S. Pat. No. 6,061,062, which is a continuation application of U.S. patent application Ser. No. 07/811,830, filed Dec. 20, 1991, now abandoned.

FIELD OF THE INVENTION

The present invention pertains to the field of computer systems. In particular, the present invention relates to a method and device enabling a computer system to access a data field having a broad range and a fine resolution.

BACKGROUND OF THE INVENTION

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

Many types of data have a broad range and a fine resolution. For example, a videodisk is composed of a continuum of frames. The video disk can store up to a series of tens of thousands of frames. Thus, it has approximately five orders of magnitude. Likewise, electronic music composition requires controlling frequencies over the entire audible scale ranging from 15 to 20,000 hertz. Thus, three orders of magnitude are required to cover this range. Similarly, a five second digital audio clip may require five orders of magnitude to access each bit sample. These types of data are often linear in the sense that there are starting and ending points and many linked "frames" of data between the starting and ending points.

In order to access a videodisk, one needs frame accurate control over the entire medium. In other words, a user must be able to readily pick out one particular desired frame nestled among tens of thousands of frames. It becomes readily apparent that tasks such as adjusting key frames in an video film or manipulating audio samples, can be quite time consuming and frustrating. What is needed is a method or apparatus which lets the user find and access one particular desired piece of data which is located among a broad range of data.

In the past, this was accomplished by using scroll bars. However, scroll bars typically can handle only two orders of magnitude. Consequently, a scroll bar would need to be approximately twenty yards long in order to grant access to each frame of a video disk. This is impracticable.

Another method used in the prior art was to implement VCR-type controls. This allows the user control over the entire range of data. However, these types of controls lack selectivity. For example, it would be difficult for a user to stop precisely on one particular desired frame of a VCR tape. The user would probably either overshoot or undershoot the desired frame and would probably go back and forth searching for that particular frame. What is needed is a method that gives the user control over a broad range, while giving the user random access to any particular piece of data within that range, especially at fine resolutions.

Yet another method used in the prior art to solve this problem is to provide one control for magnification of the data and another control for scanning at the selected magnification. One product utilizing this technique is SoundEdit™ by Farallon Computing, Inc. However, this implementation has a drawback in that it requires two separate controls. A further disadvantage is that these two controls cannot be operated simultaneously. A user has to change the magnification control independently from the navigation control. Such a system results in wasted time and effort. Thus, what is needed is a method for providing the user with easy and fluid interaction over varying magnification scales while simultaneously providing the user with the capability of scanning at that magnification scale.

SUMMARY AND OBJECTS OF THE INVENTION

In view of the problems associated with providing a user with control over a broad range of data, particularly linear data, one objective of the present invention is to provide the user with access of data down to very fine resolutions in a simple, natural, and cost effective method by utilizing a cursor positioning device such as a mouse, a trackball, touch tablet, joystick or other input device having the capability of providing control for movement in 2 dimensions (2 degrees of freedom) of a cursor.

Another objective is to increase the speed, accuracy, and selectivity of accessing data over a broad range by providing the user with easy and fluid interaction over varying magnification scales, while simultaneously providing the user with the capability of scanning the data at that magnification scale.

A method and device for accessing a broad data field having a fine resolution is described. The user selects a scale which can be varied by the user. The scale controls the magnification at which the user accesses and/or examines the data, and it may be considered that a selected magnification provides a particular range of the data (from one point to another point in the data). By moving the range to encompass different portions of the data field, the user can scan that portion of the data field. The present invention allows the user to simultaneously select the scale while moving the range over different portions of the data field. Thus, the user can "zoom in" and "zoom out" of different portions of the data field.

In one embodiment of the present invention, a particular piece of data within the broad data field can be accessed. First, the scale is selectively varied, thereby controlling a range within the data field. Then, the range is moved to encompass portions of the data field in which the piece of data resides. Next, the scale is successively decreased while, simultaneously, points successively closer to the location are kept with the range. The scale is decreased which increases the magnification (i.e., increasing the range's resolution). The range is moved in this manner until the piece of data is actually accessed.

This is accomplished by using an input device having two degrees of freedom (e.g., a mouse, trackball, touch tablet, joystick, etc.). These two degrees of freedom can be provided by movement along two different axes. For example, movement can be along the x and y-axes in a Cartesian coordinate system. Movement along one axis controls the selection of the scale, while movement along the other axis controls the particular range at that scale. In preferred embodiment, these axes can be remapped to control the position of a cursor on a display screen, instead of the scale and range. In other words, the same input device can control either the position of a cursor or control the scale and range, simply by remapping the axes of the input device.

Other objects, features, and advantages of the present invention will be apparent from the accompanying drawings and from the detailed description that follows below.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for providing the user with easy and fluid interaction over varying magnification scales, while simultaneously providing the user with the capability of scanning at that scale is described. In the following description, the present invention is implemented in reference to a Zooming History Controller and a Zooming Videodisk Controller.

It will be obvious, however, to one skilled in the art that the present invention can equally be applied to other implementations, as well. The present invention can be used in conjunction with editing textual documents. This invention enhances the user's ability to view a textual document at any point in its creation history by enabling the user to control the historical view of a document that may have been around for years and modified on a time scale of seconds. Thus, the present invention enhances the control of a document by showing the state of the document as it appeared at a selected time. Thus, the various edits to a document over time may be viewed; in other words, the document may be viewed at various stages of its creation such as a first draft, a second draft, etc.

Figure 1:
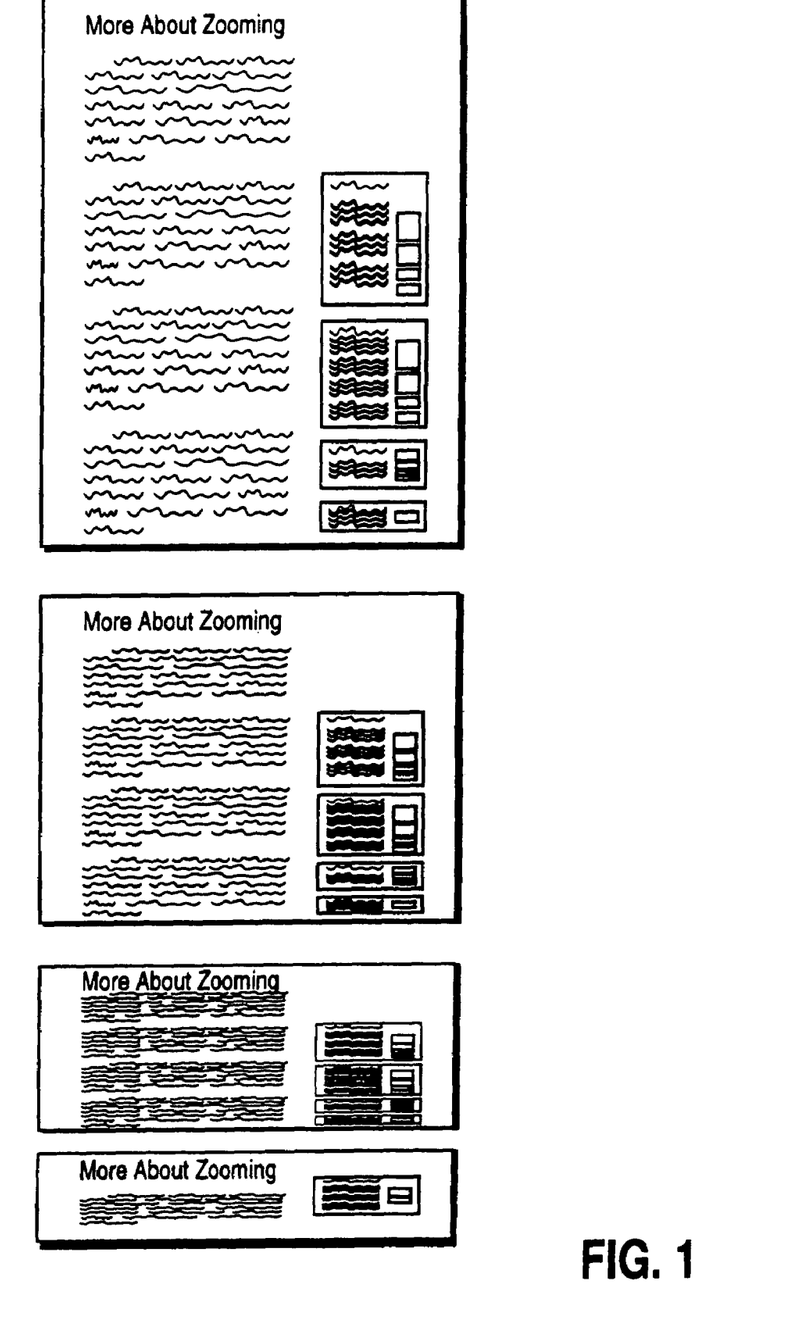
FIG. 1 shows an example of the reduction of a full sized textual document for one embodiment of the present invention.

On the other hand, the present invention can be used to graphically reduce a document. By using the structure implicit in the document, a more semantically valid zoom can be achieved. Outlines can progressively collapse the most-indented items, showing just structure and spacing. FIG. 1 shows the reduction of one page of a full sized textual document. The sequence of steps for a textual document as it is zoomed out are: squeezing out white space, squashing all but the first lines of each paragraph, eliminating all but the first lines, eliminating all body text while leaving headings and subheadings, then eliminating subheads, leaving headings only. Similarly, computer programs may also be edited in this manner.

Figure 2:
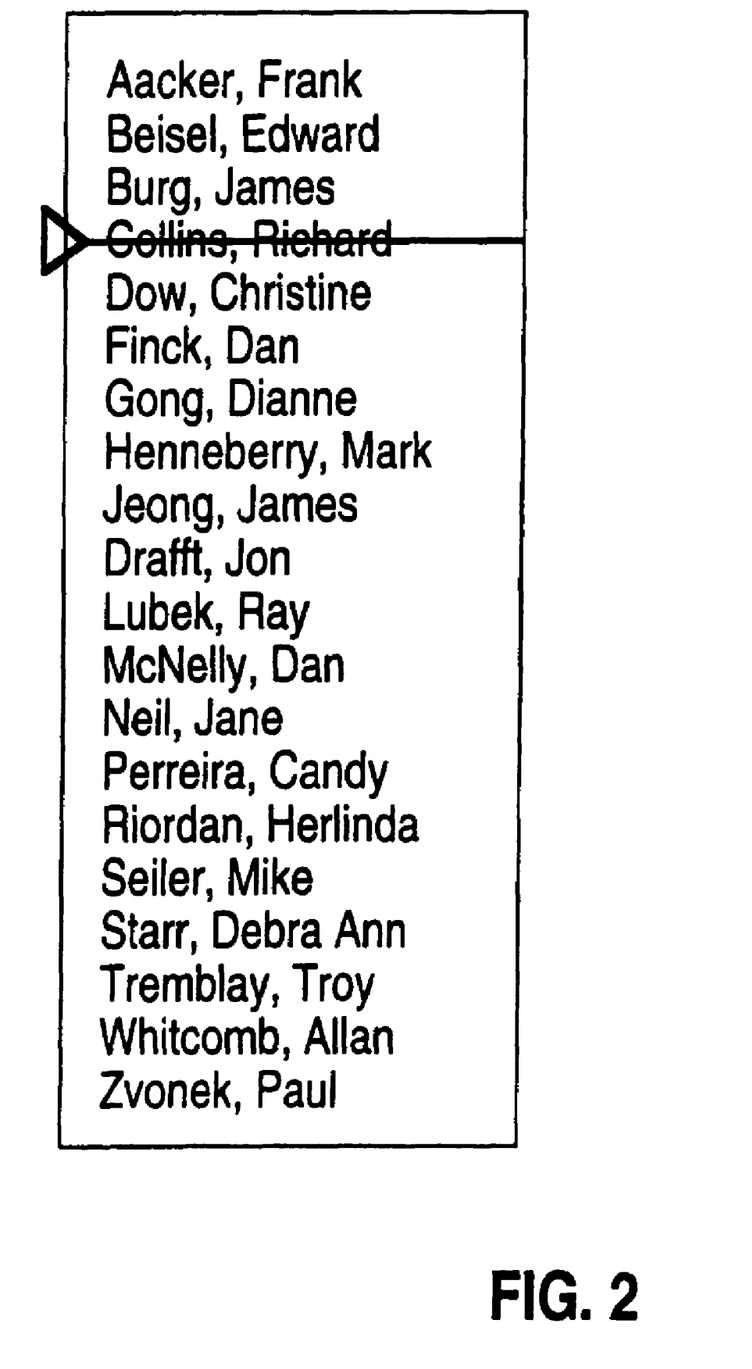
FIG. 2 shows an example of one embodiment of the present invention for accessing a name from a phone book.

The present invention also enhances accessing any collection of items that has an order, such as a data set having a linked collection of items. For example, one embodiment is to access a phone directory as shown in FIG. 2. Initially, twenty names at regular intervals from A to Z are displayed. An indicator portrayed as a triangle with an attached horizontal line, can slide up and down this list. The user can implement another control to zoom in and out of this list. For example, as the user zoomed in on Collins, the display would show names sampled over A to N, then from B to D, then only the C's, and so on. The desired name is selected by moving the indicator while zooming in on the desired name. Similarly, in another embodiment, the present invention can be used as a dictionary. The user starts with the most frequently used words and then "zooms in" on successively less frequently used words.

Another embodiment of this invention is to adjust a purely abstract number for a frequency of a music synthesizer, simulation variable, etc. Horizontal mouse movement would choose the digit that is incremented or decremented by vertical mouse motion. Along these same lines, the present invention can also be applied to adjusting key frames in a video film or manipulating audio samples.

Figure 3:
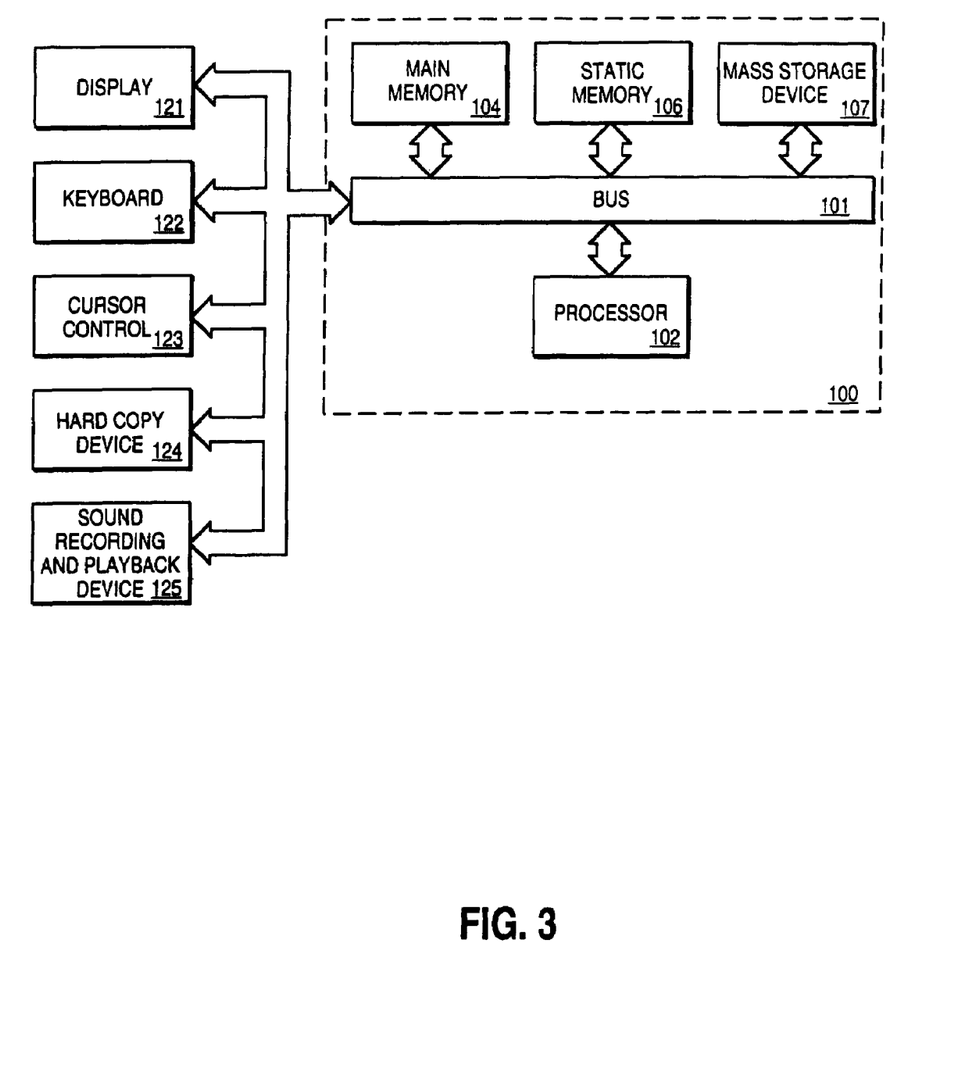
FIG. 3 is a block diagram of the computer system upon which the present invention may be implemented.

Referring to FIG. 3, the computer system upon which the preferred embodiment of the present invention is implemented is shown as 100. 100 comprises a bus or other communication means 101 for communicating information, and a processing means 102 coupled with bus 101 for processing information. System 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102, and a data storage device 107 such as a magnetic disk or optical disk and its corresponding disk drive. Data storage device 107 is coupled to bus 101 for storing information and instructions. Computer system 100 may further be coupled to a display device 121, such as a cathode ray tube (CRT) coupled to bus 101 for displaying information to a computer user. An alphanumeric input device 122, including alphanumeric and other keys, may also be coupled to bus 101 for communicating information and command selections to processor 102. An additional user input device is cursor control 123, such as a mouse, a trackball, or cursor direction keys, coupled to bus 101 for communicating direction information and command selections to processor 102, and for controlling cursor movement on display 121. This input device typically has two degrees of freedom in two axes, a first axis (e.g. x) and a second axis (e.g. y), which allows the device to specify any position in a plane. Another device which may be coupled to bus 101 is hard copy device 124 which may be used for printing instructions, data, or other information on a medium such as paper, film, or similar types of media. Lastly, computer system 100 may be coupled to a device for sound recording and/or playback 125 such as an audio digitizer means coupled to a microphone for recording information. Further, the device may include a speaker which is coupled to a digital to analog (D/A) converter for playing back the digitized sounds.

In the currently preferred embodiment, computer system 100 is one of the Macintosh® family of personal computers such as the Macintosh® II manufactured by Apple® Computer, Inc. of Cupertino, Calif. (Apple and Macintosh are registered trademarks of Apple Computer, Inc.). Processor 102 is one of the 68000 families of microprocessors, such as the 68000, 68020, or 68030 manufactured by Motorola, Inc. of Schaumburg, Ill.

Mouse Control for the Present Invention

Figure 4:
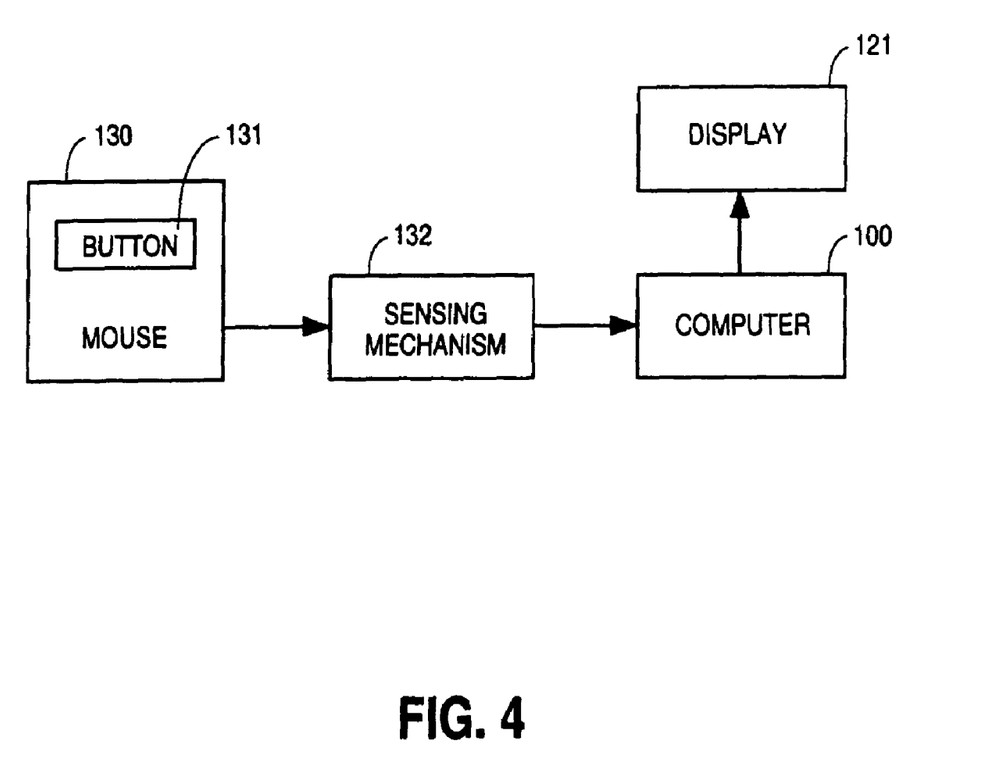
FIG. 4 is a block diagram of one embodiment wherein a mouse is utilized.

In one preferred embodiment of the present invention, a mouse is used. FIG. 4 is a block diagram showing this embodiment. A mouse 130 is a small hand-held box-like device which is coupled to the computer system 100 by a cable. A sensing mechanism 132 monitors the magnitude and direction of movement of mouse 130 and generates an output signal based thereon. This signal is sent to computer 100 for processing. After processing, computer 100 sends a signal to display device 121, which can effect a change in the display corresponding to the mouse's movements. One or more pushdown button(s) 131 are provided on the mouse 130. By depressing button(s) 131, a signal is sent to computer 100 that a desired location on display device 121 has been selected. The combination of moving mouse 130 to point a cursor to an object on the display screen and pressing the button(s) 131, while the cursor is pointing to the object to select the object, is called "point and click." An example of such a mouse can be found in U.S. Pat. No. Re. 32,632.

In the currently preferred embodiment, the mouse not only controls a cursor position on a display screen, but it can also be made to control two different parameters. The way in which this is accomplished is by "remapping" the mouse's axes from controlling the x and y-axes cursor movements to, instead, controlling two parameters. When an axis of the mouse is remapped to a parameter, motion in that axis no longer moves the cursor. Instead, it controls the parameter.

By disassociating the axis of the mouse from the cursor, the mouse movement is not constrained by the edges of the display screen. Typically, when the cursor is positioned at the edge of a display screen, further movement of the mouse in the direction towards that edge will not effect any changes in the cursor position. With the present invention, when the axes of the mouse is remapped to controlling two parameters instead of the cursor position, the mouse may be moved in a range corresponding to the range of the two parameters rather than a range constrained by the boundaries of a display screen. In short, the present invention allows an input device with two degrees of freedom such as a mouse, trackball, touch pad, joystick, etc. to remap its axes to controlling two or more different sets of parameters.

However, it can be disconcerting to users to see the cursor remaining stationary while the mouse is moving. To overcome this, the cursor is hidden whenever either axis of the mouse is being remapped. The cursor reappears when the mouse control is shifted back to controlling the cursor position.

With the cursor hidden, one problem is that visual feedback for motion in the remapped axis is reduced. This makes that axis parameter somewhat harder to control. In an alternative embodiment, this problem is minimized by ignoring the mouse's motion in the remapped axis, unless it is the dominant axis. The dominant axis is defined as being the axis that has been moved the most. Thus, only the parameter associated with the dominant axis is affected by the mouse's movements.

In one alternative embodiment, while an axis of the mouse is remapped, motion in that axis is not remapped, so the cursor retains its original position, until the mouse control is shifted back again to controlling the cursor. When both axes of the mouse are remapped to control two different parameters, the elements corresponding to those parameters will be highlighted as the parameters values change. When the mouse control is returned to controlling the cursor position, the cursor reappears over the last element affected.

The use of the mouse as a parameter control can also be supplemented by consistent visual reinforcement. For example, various icons can be used as indicators, pointers, and scrollers and various symbols may be used to represent certain aspects of the parameters being controlled.

Some parameters need an approximate setting. Others demand a more precise value. When controlling a remapped approximate parameter, each unit of motion of the mouse (~one hundredth of an inch for the Macintosh™ mouse) can effect a change in the value of the parameter. For values that need to be controlled more precisely, one preferred embodiment is to reduce the mouse's motion units by eight times. Otherwise, the mouse's movements become too sensitive.

When values are assigned to parameters, the preferred embodiment is to make the mouse axes consistent with a positive or a negative change in that parameter's value. In other words, if a slider, scroll bar, or other graphic widget is used to represent the value that the mouse is controlling, the mouse axes are remapped to the dominant graphic axes. For example, if the slider is graphically oriented vertically, upward motion of the mouse moves the slider knob up. If a parameter value has no graphic representation in the system, a standard is applied consistently. One embodiment of this concept is to define rightward and upward movement to be "more" and leftward and downward to be "less".

In the preferred embodiment of the present invention, one parameter corresponds to a scale and the other parameter corresponds to an increment within the scale's range. The mouse is used to allow a user to simultaneously adjust both the control of the time scale and the control for scanning at the selected time scale. This is accomplished by reassigning the axes of the mouse from moving the cursor to controlling the time scale and the selected value at that time scale. By depressing the mouse button while the cursor is positioned over certain interface elements, the mouse is disengaged from the cursor. Instead, vertical movement of the mouse adjusts the time scale and horizontal mouse movement adjusts the selected value at that time scale. These parameters and their control will be explained in greater detail below.

THE PREFERRED EMBODIMENT

Zooming History Controller

The present invention as applied to the Zooming History Controller enables the user to browse the time domain at any time scale (magnification) or choose an incremental time value by successive refinement. The Zooming History Controller zooms on a time continuum for picking a date/time. This is accomplished by utilizing a mouse in the manner described above.

Figure 5:
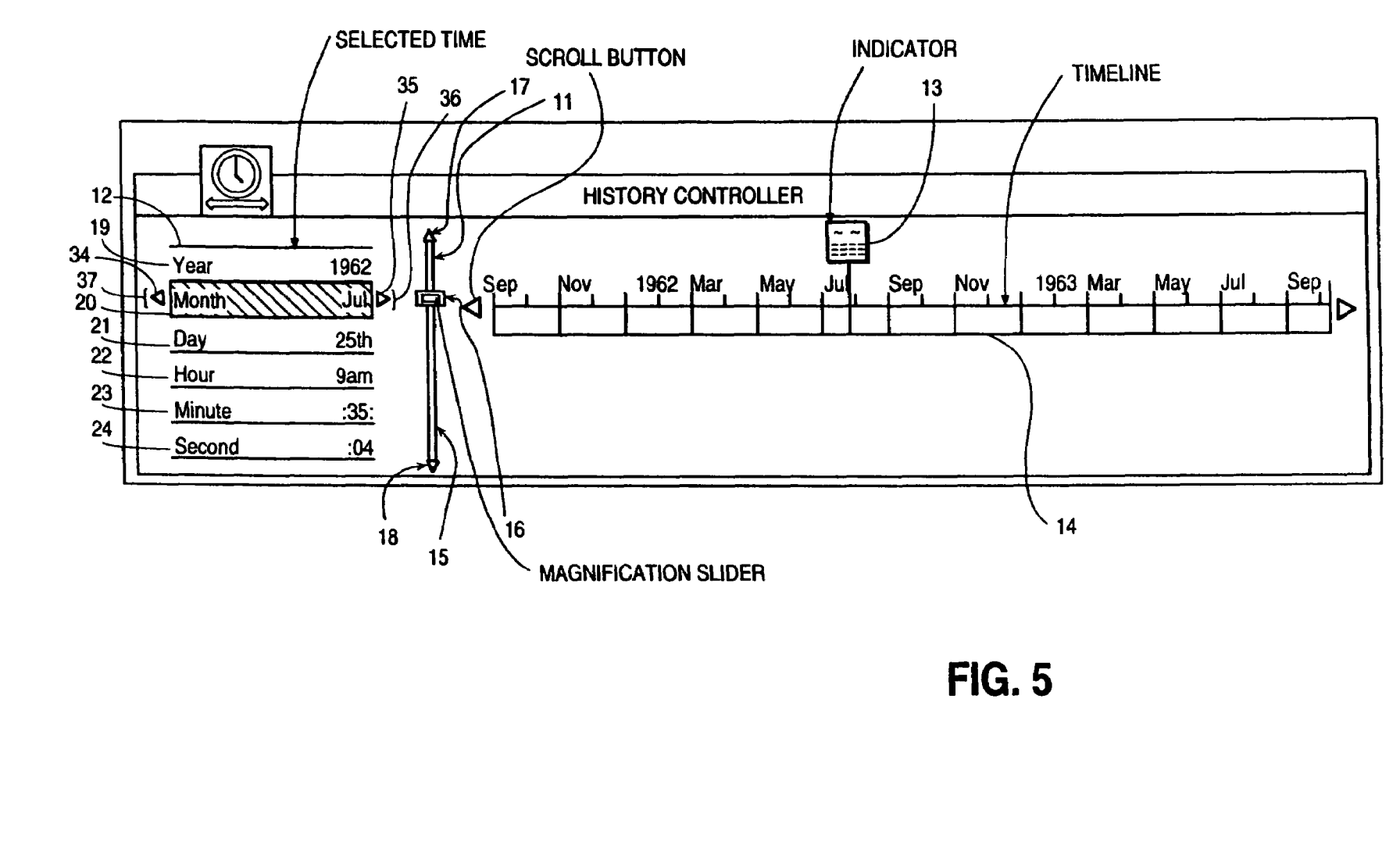
FIG. 5 is a screen shot of the Zooming History Controller display.

FIG. 5 shows the Zooming History Controller "©Apple Computer, Incorporated". Basically, the user controls two values: the time scale and the selected time within that time scale. The time scale is controlled and shown by scale slider 11. Scale slider 11 also gives the current scale of timeline 14. The selected time is shown both in the column of fields 12 and by the indicator 13 on timeline 14.

Scale slider 11 is comprised of a vertical bar 15, a control knob 16, and arrow icons 17 and 18. By using the mouse or other cursor positioning means to position the cursor on vertical bar 15 and clicking the mouse button, control knob 16 highlights and repositions itself to the cursor location. If the cursor is positioned over control knob 16 and the mouse button is depressed and kept depressed, control knob 16 will track the vertical movements of the mouse by sliding up and down vertical bar 15 as the mouse is dragged up and down. Control knob 16 will continue to track the vertical mouse movements until the mouse button is released. All the while that control knob 16 is being moved, the scale of timeline 14 is also correspondingly increased or decreased according to the vertical position of control knob 16.

Scale slider 11 can also be controlled by disassociating the mouse from the cursor and moving the mouse in a vertical motion. If the cursor is positioned over timeline 14 and the mouse button is depressed and kept depressed, control knob 16 will be highlighted and will move correspondingly to the vertical movement of the mouse. As control knob 16 slides up vertical bar 15, the scale of timeline 14 increases (i.e., the amount of time covered by the timeline increases), thereby decreasing the resolution of timeline 14. In other words, the magnification at which one observes the data (timeline) decreases. Conversely, as control knob 16 slides down vertical bar 15, the scale of timeline decreases (i.e., the amount of time covered by the timeline decreases), thereby increasing the resolution of timeline 14. As the scale of timeline 14 changes, so too is the appearance of the timeline altered to reflect the new scale.

Also, as control knob 16 moves up vertical bar 15, arrow icon 17 is highlighted. Arrow icon 17 resides at the top of vertical bar 111 and points straight up. As control knob moves down vertical bar 15, arrow icon 18 is highlighted. Arrow icon 18 resides at the bottom of vertical bar 15 and points straight down. The mouse's movements correspond to changes on the display screen in units of pixels. However, each pixel unit changes the scale value so slightly that control knob 16 might not move at all or might not appear to move. By highlighting arrow icons 17 and 18, the association between the mouse movement and the changes in scale is enhanced.

When the user releases the mouse button, the highlights and arrow markers disappear, and the cursor reappears. Even if the mouse had been moved vertically, the cursor reappears at the vertical position that it had when the mouse button was first depressed. While the mouse button was depressed, its vertical axis was decoupled from the cursor, and attached instead to controlling the scale.

Figure 6A:
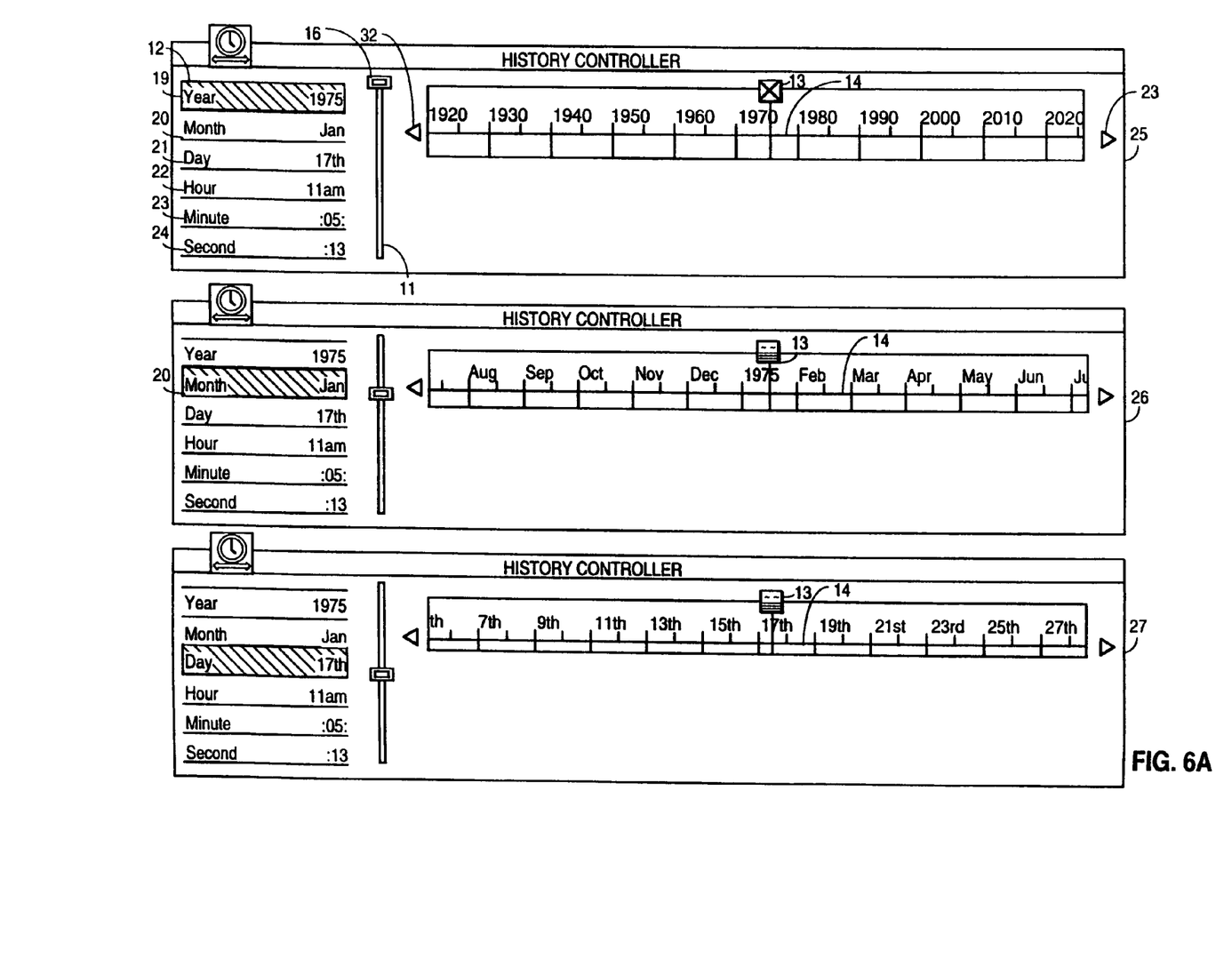
FIGS. 6A and 6B are a series of screen shots of the Zooming History Controller display at various time scales ranging from decades to seconds.
Figure 6B:
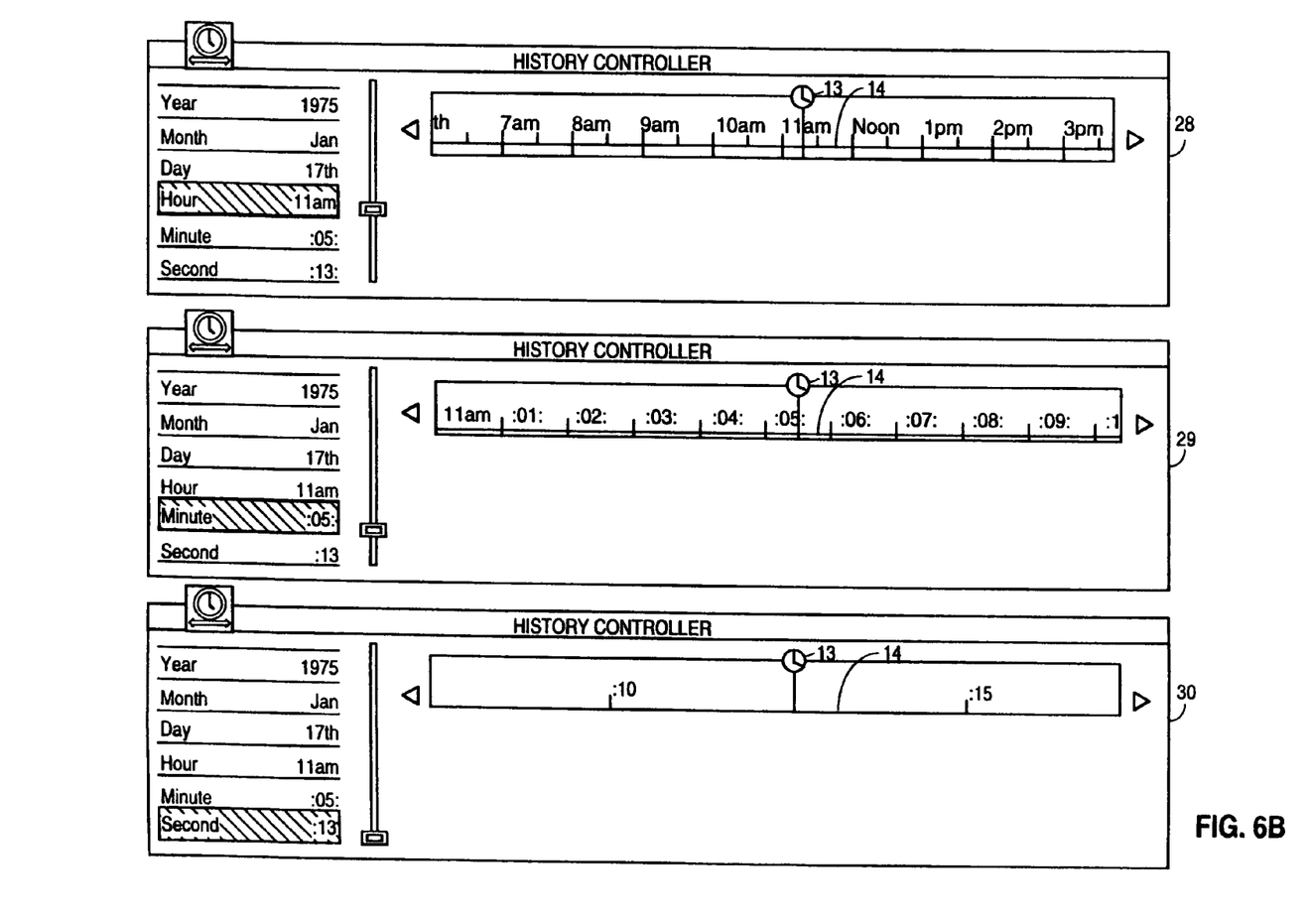

FIGS. 6A and 6B show screen shots 25-30 of timeline 14 at various scales ranging from decades to seconds. The selected time is shown by the column of fields 12. The column of fields 12 is divided into rows 19-24, corresponding to convenient time fields, shown on the left-hand side, and the selected time units, shown on the right-hand side. Row 19 gives the year field (Year) and the selected year unit (1975). Row 20 gives the month field (Month) and the selected month unit (Jan). Row 21 gives the day field (Day) and the selected day unit (17th). Row 22 gives the hour field (Hour) and the selected hour unit (11 am). Row 23 gives the minute field (Minute) and the selected minute unit (:05). Row 24 gives the seconds field (Second) and the selected second unit (:13). Thus, the selected time in FIG. 3 is 13 seconds past 11:05 am of Jan. 17, 1975.

It can be seen from screen shots 25-30 that timeline 14 looks different for different time scales, even though they represent the same selected time (i.e., 11:05:03 am Jan. 17, 1975). Screen shot 25 depicts timeline 14 wherein the scale is in years. The selected field is depicted by shading the correct row 19-24 which corresponds to that particular scale. In screen shot 25, since the year field was selected, row 19 which corresponds to the year field, is shaded. The selected year, "1975", is shown on the right-hand side of row 19. Similarly, screen shot 26 depicts timeline 14 wherein the scale is in months. Accordingly, row 20 which corresponds to the month field, is shaded. Likewise, screen shots 27-30 depict timeline 14 wherein the scale is in days, hours, minutes, and seconds, respectively.

It can be seen from screen shots 25-30 of FIGS. 6A and 6B that as the scale is decreased, the resolution of timeline 14 is increased. Screen shot 25 shows the scale in years. Timeline 14 gives a range of approximately a decade. This allows the user to select a time to a resolution of years. Screen shot 26 shows the scale in months. Its timeline gives a range of approximately two years. This allows the user to select a time to a resolution of months instead of years. As the scale is decreased, the resolution increases. Screen shot 30 shows the scale in seconds. The range of timeline 14 for screen shot 30 covers a range of approximately 15 seconds. This allows the user to select a time to a resolution of seconds. Thus, by simulating controlling the scale and value of the timeline, this embodiment allows the user to select a particular time, within seconds, from a range of a century.

The fields and the selected times are highlighted up to the current finest-resolved selected time. Finer scales and units are dim, in comparison. This is illustrated in FIGS. 6A and 6B. In screen shot 25, the selected scale is in years and the corresponding selected time unit is 1975. Thus, for that resolution, the "Year" field and the "1975" time unit are highlighted. As the resolution increases, as in screen shot 28, it can be seen that the prior selected fields (i.e., "Year", "Month", and "Day") and selected time units ("1975", "Jan", and "17th") remain highlighted. The current selected field ("Hour") and the current selected time unit ("11 am") are also highlighted. Yet the finer fields ("Minute" and "Second") and time units (":05" and ":13") which have yet to be selected by the user, remain dimmed.

As shown in FIGS. 6A and 6B, indicator 13 includes an icon and a vertical line segment. The icon for indicator 13 resides halfway along the top of timeline 14. The vertical line segment extends from the bottom of the indicator icon, through timeline 14, to the bottom edge of timeline 14. The line segment intersects timeline 14 which corresponds to the selected time (also displayed by the column of fields 12). As the scale is changed, the icon representing the indicator also changes to reflect the change in the scale. For example, the indicator icon representing the year scale, is in the shape of an hourglass, as shown in screen shot 25. The icon representing indicator 13 changes to the shape of a calendar for time scales of months and days, as shown in screen shots 26 and 27, respectively. The icon representing indicator 13 changes to the shape of a clock for time scales of hours and minutes, as shown in screen shots 28 and 29, respectively. The icon representing indicator 13 changes to the shape of a stopwatch for the time scale of seconds.

Once the desired field has been selected, the user may then select any time unit within that field. For example, in screen shot 26 of FIG. 6A, since the user has selected the month scale, the user may now select time units corresponding to months of the year (e.g., Jan.-Dec.). This is accomplished by moving the mouse horizontally. (Remember that the scale was controlled by moving the mouse vertically.) Horizontal movement of the mouse controls the timeline and thus the position of access into the data at the selected scale/magnification.

Furthermore, once a desired field has been selected, the scale can, nevertheless, be changed within that field. For example, in screen shot 25 of FIG. 6A, even though the selected field is "Years", the user may change the scale of timeline 14 so long as what is displayed remains in years. Thus, timeline 14 may have an enlarged scale such that a decade is shown or may have a reduced scale such that only half a dozen years are shown. Likewise, in screen shot 27, given the same field ("Day"), timeline 14 may have a scale encompassing 12 days (as shown) or may have a reduced scale encompassing only a couple of days.

Figure 7:
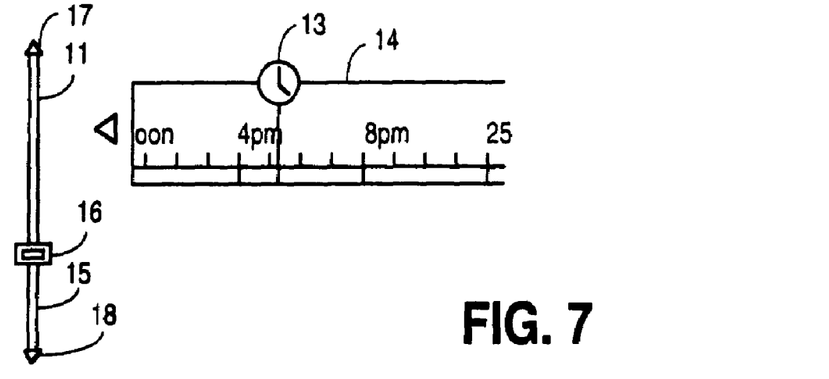
FIG. 7 depicts the auto-scrolling of the Zooming History Controller's timeline (allowing movement at a particular magnification through the data) and scale slider (allowing modification of the magnification at which the data can be scanned).

FIG. 7 shows the manipulation of the timeline. The timeline is manipulated by using the mouse to position the cursor over some point of timeline 14. When the mouse button is then "clicked", indicator 13 is repositioned to where the cursor is located. Indicator 13 and control knob 16 are highlighted. Arrows 17 and 18 appear above and below vertical bar 15 of scale slider 11. In addition, the cursor is removed from the display screen so that it is no longer displayed.

As the mouse is moved horizontally to the left and right, while still keeping the mouse button depressed, indicator 13 tracks the mouse's movements. In other words, indicator 13 (i.e., the icon and the vertical line segment) moves horizontally, left and right, across the width of timeline 14 to track the mouse's movements.

Figure 8:
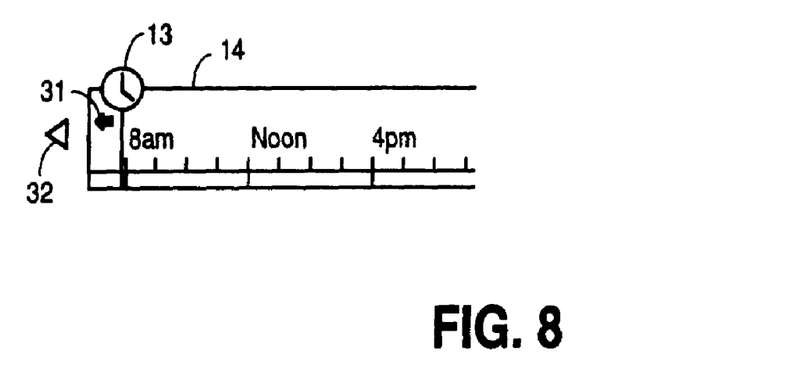
FIG. 8 depicts auto-scrolling the Zooming History Controller's timeline.

When the indicator is moved horizontally, it is constrained to stay within the boundaries of the timeline. If the indicator is moved to either the right or left ends of the timeline, an arrow symbol appears. FIG. 8 shows the situation wherein indicator 13 is moved towards the left end of timeline 14. When indicator 13 reaches the left-most edge of timeline 14, arrow symbol 31 appears to the left of indicator 13 and points leftward. Similarly, if the indicator is moved to the right-most edge of the timeline, an arrow symbol pointing to the right will appear to the right of the indicator.

When the indicator is moved to either edge of the timeline, in addition to the display of the arrow symbol, the timeline will scroll. The timeline will scroll to the right if the indicator is moved to the left-most edge. Conversely, the timeline will scroll to the left if the indicator is moved to the right-most edge. Thus, in FIGS. 6A and 6B, the "8 am", "Noon", "4 pm", etc. markers and their corresponding submarkers will be scrolled to the right. New markers such as "4 am", "Midnight", "8 pm", etc. and their corresponding submarkers will successively appear from the left and be progressively scrolled to the right.

Figure 9:
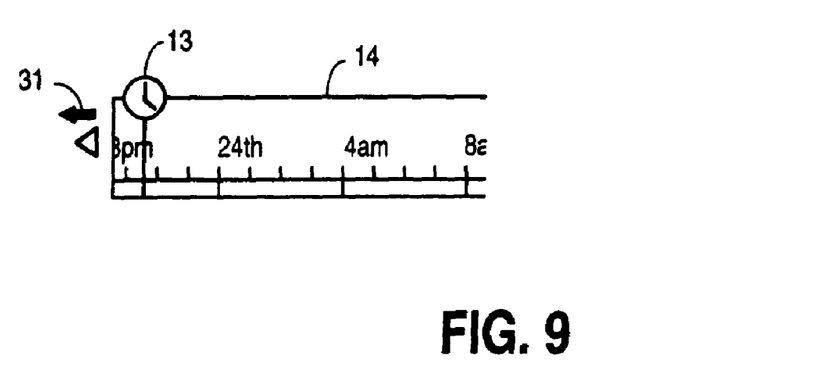
FIG. 9 depicts the Zooming History Controller's timeline when the user scrolls the timeline rapidly.

Furthermore, if the mouse is moved to the right or left, beyond the extremes of the timeline, the rate of the scrolling will increase. In addition, the arrow symbol will become longer. The farther that the mouse is moved beyond the timeline extremes, the faster the scrolling rate and the longer the arrow symbol become. FIG. 7 shows the situation wherein the mouse is moved to the left, beyond the left-most edge of timeline 14. It can be seen that indicator 13 is constrained within timeline 14. As the mouse is moved beyond that point, arrow symbol 31 becomes longer and timeline 14 is scrolled faster as shown in FIG. 9.

The timeline may also be scrolled without moving the indicator. This is accomplished by using two arrow icons which are positioned on either side of the timeline. Referring back to FIGS. 6A and 6B, it can be seen that arrow icons 32 and 33 are respectively located to the immediate left and right of timeline 14. Arrow icon 32 points to the left, and arrow icon 33 points to the right. If the user positions the cursor over one of these two arrow icons, depresses the mouse button, and keeps it depressed, several events happen simultaneously. The cursor disappears, the selected arrow icon is highlighted, arrow icons appear above and below scale slider 1, control knob 16 becomes highlighted, timeline 14 begins to scroll, and arrow symbols appear.

Now, vertical motion of the mouse controls the scale. Horizontal motion of the mouse controls the direction and speed of timeline 14. Moving the mouse horizontally and vertically at the same time (i.e. a diagonal movement) will simultaneously adjust the scale and the position of access to the data at the selected scale. The direction of the scroll depends on which of the two arrow icons 32 or 33 that had been selected. If arrow icon 32 was selected, then timeline 14 scrolls to the right. Conversely, if arrow icon 33 was selected, then timeline 14 scrolls to the left.

FIG. 8 depicts the situation wherein the user has selected the left-pointing arrow icon 32. The more that the user moves the mouse to the left, the faster timeline 14 scrolls and left-pointing arrow symbol 31 lengthens correspondingly (as depicted in FIG. 9). If the user moves the mouse to the right, the rate at which timeline 14 scrolls is reduced and the length of arrow symbol 31 shortens. Similarly, if the user had selected the right-pointing arrow icon, that icon would be highlighted. Now, the further that the mouse is moved to the right, the faster timeline 14 scrolls to the left and the right-pointing arrow symbol lengthens correspondingly. If the mouse is moves to the left, the rate at which timeline 14 scrolls is reduced and the length of the right-pointing arrow symbol shortens.

The timeline may also be scrolled by positioning the cursor on one of the fields, depressing the mouse button, and keeping it depressed. The field then becomes highlighted and the timeline's scale changes correspondingly. The cursor disappears and arrow icons appear above and below scale slider 11 and to the right and left of the selected field. As before, vertical movement changes the timeline scale. However, now the scales are limited to that particular field selected.

For example, in FIG. 5, if the user selects the "Month" field 20 within the column of fields 12, timeline 14 is limited to displaying units of time in months. The user may move the mouse vertically in order to change the scale within this field in order to display more or less months. However, the user is limited to displaying time units of months. This means that the other fields such as "Year", "Day", "Hour", "Minute", and "Second" cannot be accessed just by moving the mouse vertically.

Horizontal movement of the mouse, in this mode, scrolls timeline 14. Note that indicator 13 remains stationary. Moving the mouse to the right causes timeline 14 to scroll to the left and increments the selected time unit corresponding to that field. Moving the mouse to the left causes timeline 14 to scroll to the right and decrements the selected time unit corresponding to that field. The time units corresponding to fields that have higher resolutions than the selected field remain unchanged. Only those time units which correspond to the selected field or a lower resolution field, change according to the scrolling of the timeline.

Thus, in FIG. 5, this mode allows the user to scroll timeline 14 by horizontal mouse movements. The currently selected field 20 is that of "Month", which is highlighted. The currently selected time unit is "Jul" as shown in field 20 and by indicator 13. If timeline 14 is scrolled to the right by moving the mouse to the left, the time unit would successively change to "June", "May", "April", etc. Eventually, if timeline 14 were scrolled far enough to the right, the time unit for the "Year" field 19 would change from its current "1962" to "1961". However, fields with higher resolutions (e.g., "Day" 21, "Hour" 22, "Minute" 23, and "Second" 24) than the currently selected field, along with their time units (e.g., "25th", "9 am", ":35", and ":04"), remain unchanged.

FIG. 5 also shows arrow icons 34 and 35 straddling the selected "Month" field 20. These arrow icons appear when the user selects this mode (i.e., when the user "clicks" the cursor on a particular field). Arrow icon 34 is positioned to the immediate left of the selected field and points to the left. Arrow icon 35 is positioned to the immediate right of the selected field and points to the right. Arrow icon 34 is highlighted if timeline 14 is scrolled to the right. Arrow icon 35 is highlighted if timeline 14 is scrolled to the left.

A small bracket appears across the tip of any of the above discussed arrow icons (i.e., scale slider, timeline, or field arrow icons) if the parameter described by that arrow icon reaches an outer limit. The bracket indicates that the parameter as represented by that icon has reached a limit and is being "blocked". The parameter remains blocked by the bracket until the parameter is pulled back from the limit.

For example, in FIG. 5, if timeline 14 were constrained to not extend after the date of July 1962, a bracket 36 would appear across the tip of field arrow icon 35, if the user attempted to scroll after the date of July 1962. If timeline 14 were constrained to not extend prior to the date of July 1962, a bracket 37 would appear across the tip of field arrow icon 34, if the user attempted to scroll prior to July 1962. Another example would be if the user attempted to increase the scale to a field greater than a "Year", a bracket would appear across the tip of scale arrow icon 17.

It would be apparent to those skilled in the art that the Zooming History Controller can be linked to and access a database. Some sample databases include musical compositions, films, textual documents, etc. For example, by linking the Zooming History Controller to a musical composition, the user may easily access one particular note among thousands within the composition. This is accomplished by assigning each note to one particular incremental time unit. The user may "zoom out" to locate the general area wherein the desired note resides. The user then "zooms in" on the desired note by successively decreasing the scale (increasing the magnitude) while keeping the note within the range until the desired note is located. Thus, the user may select a desired note by "zooming in" on it in the same manner as one would "zoom in" on a particular date/time. In other words, pieces of data within a database may be sequentially linked to incremental time intervals of the Zooming History Controller. As example of this concept is described in a following section entitled "Zooming Videodisk Controller", wherein the frames of a videodisk (or film) may be easily accessed.

Software Implementation

In one preferred embodiment of the present invention, the Zooming History Controller is divided into two functional blocks of software code. One block draws the contents of the Zooming History Controller based on a number of parameters. The other block changes the parameters based on the user's input. These blocks are referred to as the Draw and the Track routines, respectively.

The primary parameters to the Draw routine specify the currently selected time, the magnification, and the position of the indicator. Secondary parameters control the appearance and highlight of the various symbols and icons. This routine draws the Zooming History Controller off-screen and then copies it onto the display screen in order to minimize flashing and visual inconsistency. The primary parameters sometimes require drawing parts of the timeline that are not accessible to the user. For example, the times before and after the timeline's outer limits.

When the user "clicks" on one of the elements in the Zooming History Controller, the corresponding Track routine is invoked. Each Track routine starts by altering the mouse behavior (from controlling the cursor position to controlling the parameters) and changing the secondary parameters to make symbols and icons appear and highlight. While the mouse button is depressed, the Track routine repeatedly changes the parameters in response to mouse movement and invokes the Draw routine. The Zooming History Controller display is redrawn once more with the secondary parameters restored to normal. The mouse behavior is restored to controlling the cursor position.

A copy of a software computer code "© Apple Computer, Incorporated" (17 U.S.C. 401) for the Zooming History Controller written for the Macintosh IIfx™ computer is contained in Appendix A of a parent application of the present application, U.S. patent application Ser. No. 08/104,251, filed Aug. 9, 1993 and now U.S. Pat. No. 6,061,062, which is hereby incorporated herein by reference.

AN ALTERNATIVE EMBODIMENT

Zooming Videodisk Controller

Figure 10:
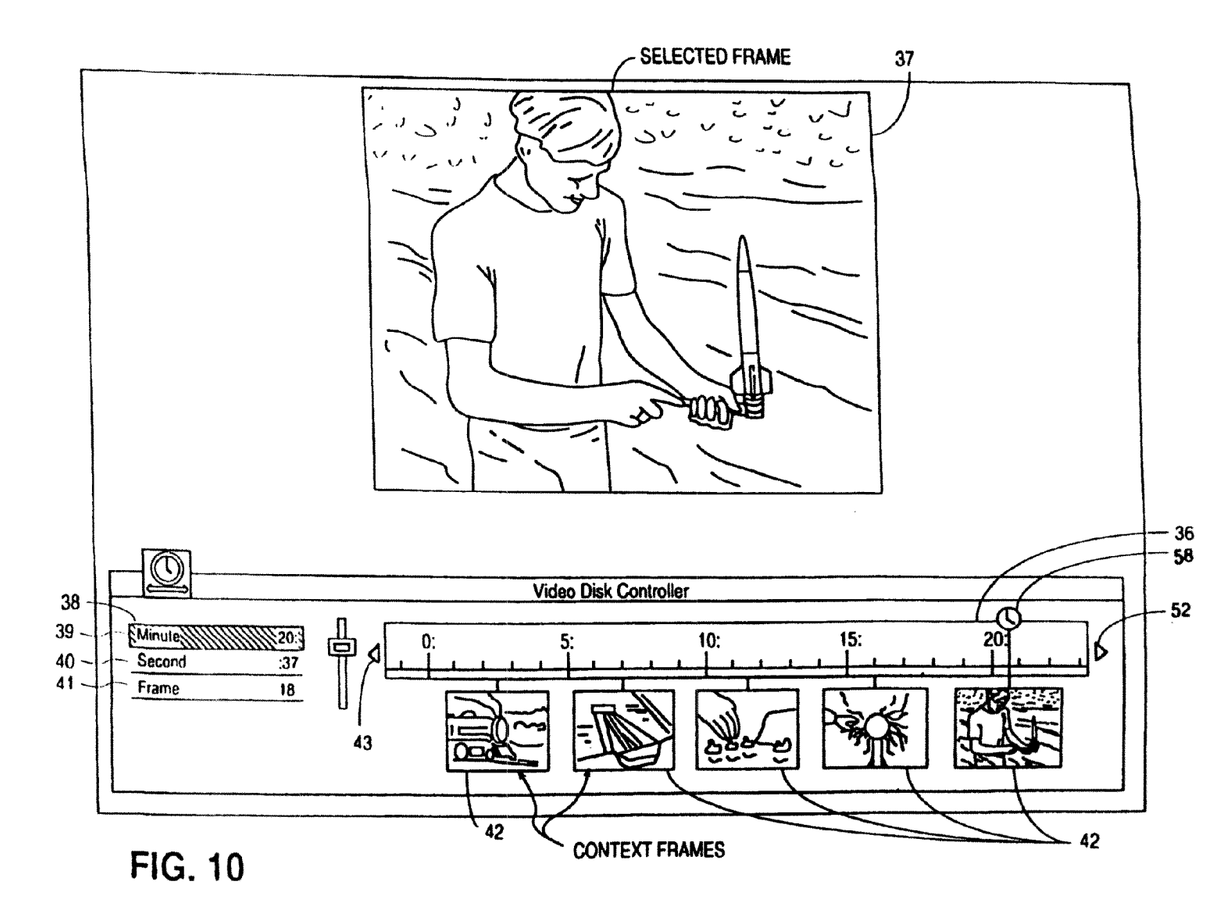
FIG. 10 shows an alternate embodiment of the present invention as applied to videodisks, the Zooming Videodisk Controller.

FIG. 10 shows an alternative embodiment of the present invention as applied to videodisks, the Zooming Videodisk Controller "© Apple Computer, Incorporated". Basically, the Zooming Videodisk Controller operates in the same manner as the Zooming History Controller described above, with the following distinctions.

Similar to the Zooming History Controller, the user controls the time scale. However, in the Zooming Videodisk Controller, the user controls the selection of a video frame within that time scale, instead of a time unit.

The scale is controlled in the same manner as described in the Zooming History Controller (i.e., scale slider 39 and vertical mouse movements disassociated from the cursor). An individual frame within that scale is selected in the same manner as a particular time unit was selected in the Zooming History Controller (i.e., manipulating the timeline or moving the indicator along the timeline).

In FIG. 10, timeline 36 is divided into units of time which are further subdivided into individual frames on the videodisk. Thus, the present invention enables a user to select one particular frame among thousands of frames on a videodisk. The selected time and frame is shown by the position of indicator 58 along timeline 36 and also displayed by column of fields 38. Column of fields 38 is comprised of rows 39-41. Row 39 is the "Minute" field and displays the currently selected minute in reference to the start of the videodisk. Row 40 is the "Second" field and displays the currently selected seconds in reference to the minutes. Row 41 is the "Frame" field and displays the currently selected frame in reference to the minutes and seconds. Another embodiment is to include an "Hour" row in the column of fields, in the case of longer videodisks. In FIG. 9, the currently selected frame corresponds to 20 minutes, 37 seconds and 16 frames into the videodisk, "20:37:16".

The frame corresponding to the selected time/frame is pulled from the videodisk and displayed above timeline 36. This is illustrated by selected frame 37. Selected frame 37 is defined by column of fields 38 and the position of indicator 58 along timeline 36. As the user changes the selected time/frame, the corresponding frame is pulled from the videodisk and displayed.

Context frames 42 are sampled at regular intervals of the videodisk and displayed below timeline 36. Context frames 42 are displayed directly below the point of timeline 36 corresponding to their location on the timeline. Vertical line segments connect context frames 42 to the corresponding point where they are located on timeline 36. Context frames 42 are used to give the user a reference point as to the section of the videodisk which is represented by that section of the timeline. Context frames 42 scroll in concert with timeline 36 and adjust according to the scale. If the user positions the cursor over a context frame 42 and "clicks" the mouse button, the Zooming Videodisk Controller responds in the same manner as when timeline 36 is "clicked", with one exception. When the mouse is moved horizontally, both indicator 58 and timeline 36 track the mouse's movements. In one embodiment, a graphic representation of the number of video frames between a pair of context frames 42 is shown to inform the user how much real time lies between that pair of context frames. In another embodiment, a graphic representation of the entire disk with a highlight of the timeline portion is used to inform the user what part of the video disk the current selected frame 37 resides in.

One aspect of the Zooming Videodisk Controller is that it can be used to perform functions similar to the "jog/shuttle" functions found on some high-end videotape decks. To scan over a video sequence, the user can zoom in (i.e., decrease the scale) so that the whole scene is covered in timeline 36. The user accomplishes this by adjusting the scale in reference to context frames 42. Indicator 58 is then dragged across timeline 36 to simulate the "jog" control, but at an adjustable scale.

The "shuttle" function is simulated by positioning indicator 58 to the beginning of the scene. Then, right scroll arrow icon 52 is selected via the mouse. The scene "plays" as selected frames 37 are successively displayed. The scene "plays" at the rate determined by the current scale and the current scroll speed. The scene can be "played" in reverse by selecting left scroll arrow icon 43. The user can also "freeze frame" by changing the scroll speed to zero.

Figure 11:
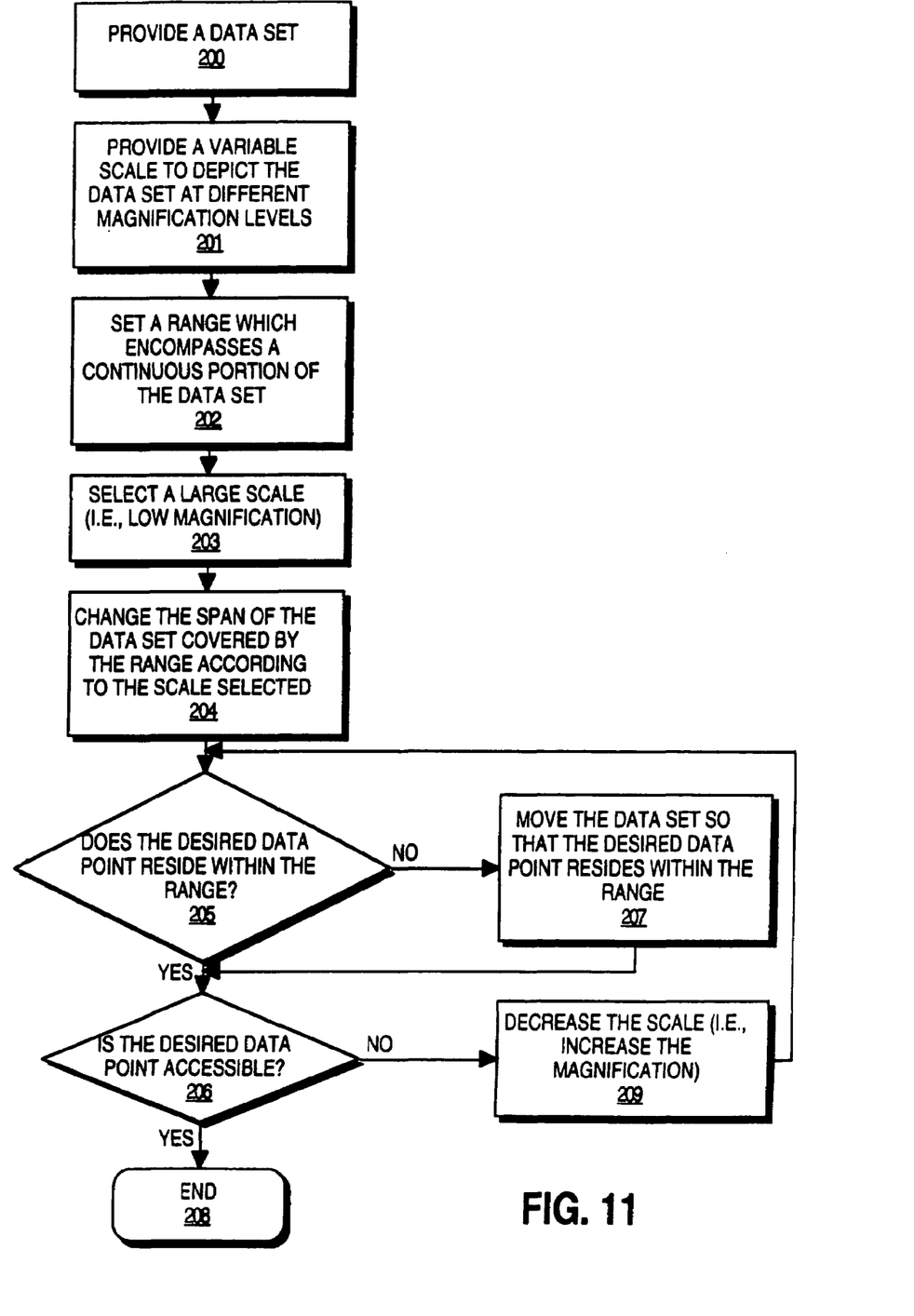
FIG. 11 shows a flowchart of a preferred embodiment.

A preferred embodiment of the present invention will now be described by referring to the flowchart shown in FIG. 11. The first step 200 is to provide a data set (e.g., musical composition, film, textual document, etc.) to the computer system. Next, in step 201, a variable scale is provided to the user. The y-axis of a mouse is remapped so that instead of controlling the vertical position of a cursor, vertical mouse movement controls the scale. As the scale is increased or decreased, the magnification level decreases or increases, respectively. In addition, a range is provided to display continuous portions of the data set to the user in step 202. What is depicted by the range is dependent on the scale selected. The range will span a broad portion of the data set for a large scale. However, the resolution will be low. Conversely, if the scale is reduced, the magnification level increases and narrower portions of the data set are depicted by the range. As the scale is reduced, the resolution increases. The range can be made to cover different portions of the data set for a given scale. This is accomplished by remapping the x-axis of the mouse so that instead of controlling the horizontal position of a cursor, horizontal mouse movement controls what portion of the data set is covered by the range.

In order to access a desired data point within a broad data set, the user starts in step 203 by selecting a relatively large scale. In step 204, the computer will change the span of the data set covered by the range according to the scale selected. Next, the user determines in step 205 whether the desired data point resides within the portion of the data set as depicted by the range. If so, then step 207 may be skipped. Otherwise, step 207 requires the user to move the data set relative to the range so that the desired data point resides within the portion depicted by the range. This is typically done by moving the cursor positioning device (e.g. mouse) in a horizontal direction. Afterwards, a decision must be made in step 206. Is the desired data point accessible? If the answer is "yes", then the desired data point is accessed and that is the end (step 208). If the answer is "no", then the scale must be decreased (as shown by step 209 by moving the cursor positioning device in a vertical direction) and the procedure must be repeated, starting back from step 205 until the scale is decreased enough so that the desired data point is accessible.

What is claimed is:

1. In a computer system, a method of navigating within a set of data items, comprising:
    displaying a user interface on a display device comprising a scale and an identifier of a current position along the scale, wherein the scale corresponds to a range including at least a subset of the data items;
    receiving user input indicating movement;
    responsive to an indication of movement along a first axis or a second axis, controlling a position of a cursor on the display device;
    responsive to the indication of movement along the first axis, changing the scale, wherein the scale corresponds to a resolution of the range, such that a change in the scale corresponds to a change in the resolution of the range, wherein changing the scale comprises remapping the user input indicating movement along the first axis to control the change in the scale; and
    responsive to the indication of movement along the second axis, changing the current position along the scale, wherein changing the current position along the scale comprises remapping the user input indicating movement along the second axis to control the change in the current position along the scale.

2. The method of claim 1, wherein changing the current position along the scale comprises:
    responsive to an indication of movement in a first direction along the second axis, moving the current position identifier in a first direction along the scale; and
    responsive to an indication of movement in a second direction along the second axis, moving the current position identifier in a second direction along the scale.

3. The method of claim 1, wherein the set of data items comprises a video sequence, and wherein the current position represents a frame of the video sequence.

4. The method of claim 3, further comprising displaying the frame represented by the current position.

5. The method of claim 3, further comprising displaying at least one context frame corresponding to a point along the scale.

6. The method of claim 1, wherein the set of data items comprises audio samples, and wherein the current position represents an audio sample in the audio samples.

7. The method of claim 6, further comprising outputting the audio sample represented by the current position.

8. The method of claim 1, wherein the set of data items comprises a plurality of versions of a document, and wherein the current position represents one of the versions.

9. The method of claim 8, further comprising displaying the version represented by the current position.

10. The method of claim 1, wherein the set of data items comprises portions of a textual document, and wherein the current position represents one of the portions.

11. The method of claim 10, further comprising displaying at least the portion of the textual document represented by the current position.

12. The method of claim 10, further comprising selectively displaying at least one portion of the document at a semantic zoom level corresponding to the scale.

13. The method of claim 10, further comprising displaying a collapsed version of the document, wherein the degree to which the displayed version is collapsed corresponds to the scale.

14. The method of claim 10, wherein each portion of the textual document comprises a word.

15. The method of claim 1, further comprising displaying a representative subset of the data items in the range, the subset substantially spanning the range.

16. The method of claim 1:
wherein receiving user input comprises receiving user input indicating substantially simultaneous movement along both the first axis and the second axis; and
wherein changing the scale and changing the current position are performed substantially simultaneously and responsively to the indication of substantially simultaneous movement along both the first axis and the second axis.

17. The method of claim 1, wherein the data items are stored in a database.

18. The method of claim 1, wherein receiving user input comprises detecting user movement of an input device indicating movement along a first axis, a second axis, or a combination thereof.

19. The method of claim 18, wherein the input device comprises one selected from the group consisting of:
a mouse;
a trackball;
a touch tablet;
a joystick;
cursor direction keys; and
a touch pad.

20. The method of claim 1, wherein changing the scale comprises:
responsive to an indication of movement in a first direction along the first axis, increasing the range of the scale; and
responsive to an indication of movement in a second direction along the first axis, decreasing the range of the scale.

21. The method of claim 1, wherein the first axis is a vertical axis and the second axis is a horizontal axis.

22. The method of claim 1, wherein receiving user input comprises detecting at least one key press indicating movement.

23. The method of claim 1, further comprising:
displaying a first on-screen indicator representing the scale; and
responsive to an indication of movement along the first axis, displaying a second on-screen indicator representing the changed scale.

24. A computer program product of navigating within a set of data items, comprising:
a computer readable medium; and
computer program code, encoded on the medium, for controlling a processor to perform the operations of:
displaying a user interface on a display device, the user interface comprising a scale and an identifier of a current position along the scale, wherein the scale corresponds to a range including at least a subset of the data items;
receiving user input indicating movement;
responsive to an indication of movement along a first axis or a second axis, controlling a position of a cursor on the display device;
responsive to the indication of movement along the first axis, changing the scale, wherein the scale corresponds to a resolution of the range, such that a change in the scale corresponds to a change in the resolution of the range, wherein changing the scale comprises remapping the user input indicating movement along the first axis to control the change in the scale; and
responsive to the indication of movement along the second axis, changing the current position along the scale, wherein changing the current position along the scale comprises remapping the user input indicating movement along the second axis to control the change in the current position along the scale.

25. The computer program product of claim 24, wherein the computer program code for controlling a processor to perform the operation of changing the current position along the scale comprises computer program code for controlling a processor to perform the operations of:
responsive to an indication of movement in a first direction along the second axis, moving the current position identifier in a first direction along the scale; and
responsive to an indication of movement in a second direction along the second axis, moving the current position identifier in a second direction along the scale.

26. The computer program of claim 24, wherein the set of data items comprises a video sequence, and wherein the current position represents a frame of the video sequence.

27. The computer program product of claim 26, further comprising computer program code, encoded on the medium, for controlling a processor to perform the operation of displaying the frame represented by the current position.

28. The computer program product of claim 26, further comprising computer program code, encoded on the medium, for controlling a processor to perform the operation of displaying at least one context frame corresponding to a point along the scale.

29. The computer program of claim 24, wherein the set of data items comprises audio samples, and wherein the current position represents an audio sample in the audio samples.

30. The computer program product of claim 29, further comprising computer program code, encoded on the medium, for controlling a processor to perform the operation of outputting the audio sample represented by the current position.

31. The computer program product of claim 24, wherein the set of data items comprises a plurality of versions of a document, and wherein the current position represents one of the versions.

32. The computer program product of claim 31, further comprising computer program code, encoded on the medium, for controlling a processor to perform the operation of displaying the version represented by the current position.

33. The computer program product of claim 24, wherein the set of data items comprises portions of a textual document, and wherein the current position represents one of the portions.

34. The computer program product of claim 33, further comprising computer program code, encoded on the medium, for controlling a processor to perform the operation of displaying at least the portion of the textual document represented by the current position.

35. The computer program product of claim 33, further comprising computer program code, encoded on the medium, for controlling a processor to perform the operation of selectively displaying at least one portion of the document at a semantic zoom level corresponding to the scale.

36. The computer program product of claim 33, further comprising computer program code, encoded on the medium, for controlling a processor to perform the operation of displaying a collapsed version of the document, wherein the degree to which the displayed version is collapsed corresponds to the scale.

37. The computer program product of claim 33, wherein each portion of the textual document comprises a word.

38. The computer program product of claim 24, further comprising computer program code, encoded on the medium, for controlling a processor to perform the operation of displaying a representative subset of the data items in the range, the subset substantially spanning the range.

39. The computer program product of claim 24:
wherein the computer program code for controlling a processor to perform the operation of receiving user input comprises computer program code for controlling a processor to perform the operation of receiving user input indicating substantially simultaneous movement along both the first axis and the second axis; and
wherein the computer program code for controlling a processor to perform the operations of changing the scale and changing the current position comprises computer program code for controlling a processor to perform the operations substantially simultaneously and responsively to the indication of substantially simultaneous movement along both the first axis and the second axis.

40. The computer program product of claim 24, wherein the data items are stored in a database.

41. The computer program product of claim 24, wherein the computer program code for controlling a processor to perform the operation of receiving user input comprises computer program code for controlling a processor to perform the operation of detecting user movement of an input device indicating movement along a first axis, a second axis, or a combination thereof.

42. The computer program product of claim 41, wherein the input device comprises one selected from the group consisting of:
a mouse;
a trackball;
a touch tablet;
a joystick;
cursor direction keys; and
a touch pad.

43. The computer program product of claim 24, wherein the computer program code for controlling a processor to perform the operation of changing the scale comprises computer program code for controlling a processor to perform the operations of:
responsive to an indication of movement in a first direction along the first axis, increasing the range of the scale; and
responsive to an indication of movement in a second direction along the first axis, decreasing the range of the scale.

44. The computer program product of claim 24, wherein the first axis is a vertical axis and the second axis is a horizontal axis.

45. The computer program product of claim 24, wherein the computer program code for controlling a processor to perform the operation of receiving user input comprises computer program code for controlling a processor to perform the operation of detecting at least one key press indicating movement.

46. The computer program product of claim 24, further comprising computer program code, encoded on the medium, for controlling a processor to perform the operations of:
displaying a first on-screen indicator representing the scale; and
responsive to an indication of movement along the first axis, displaying a second on-screen indicator representing the changed scale.

47. The computer program product of claim 46, wherein each on-screen indicator comprises text.

* * * * *